United States Patent
Jung et al.

(10) Patent No.: US 8,102,427 B2
(45) Date of Patent: Jan. 24, 2012

(54) CAMERA EGOMOTION ESTIMATION FROM AN INFRA-RED IMAGE SEQUENCE FOR NIGHT VISION

(75) Inventors: Sang-Hack Jung, Lawrenceville, NJ (US); Jayan Eledath, Robbinsville, NJ (US)

(73) Assignee: SRI International, Menlo Park, CA (US)

( * ) Notice: Subject to any disclaimer, the term of this patent is extended or adjusted under 35 U.S.C. 154(b) by 812 days.

(21) Appl. No.: 12/203,322

(22) Filed: Sep. 3, 2008

(65) Prior Publication Data
US 2009/0207257 A1    Aug. 20, 2009

Related U.S. Application Data

(60) Provisional application No. 61/028,861, filed on Feb. 14, 2008.

(51) Int. Cl.
*H04N 5/225* (2006.01)
*G06F 12/00* (2006.01)

(52) U.S. Cl. .................................. 348/208.1; 348/118
(58) Field of Classification Search .......... 348/113–118, 348/208.1
See application file for complete search history.

(56) References Cited

U.S. PATENT DOCUMENTS

| | | | | |
|---|---|---|---|---|
| 7,777,816 | B2 * | 8/2010 | Chang et al. | 348/620 |
| 2002/0057241 | A1 * | 5/2002 | Oda et al. | 345/87 |
| 2003/0142752 | A1 * | 7/2003 | Demas et al. | 375/240.27 |
| 2005/0078081 | A1 * | 4/2005 | Oda et al. | 345/102 |
| 2006/0114359 | A1 * | 6/2006 | Chang et al. | 348/701 |

OTHER PUBLICATIONS

D. Nister, O. Naroditsky, and J. Bergen, "Visual Odometry," Proc. IEEE Conf. on Comp. Vision and Patt. Recog., 01:652-659, 2004.
J. G. Stein, O. Mano, and A. Shashua, "A robust method for computing vehicle ego-motion," Intelligent Vehicles Symposium, 2000. IV 2000. Proceedings of the IEEE, Volume , Issue , 2000 pp. 362-368.
J. G. Stein and A. Shashua, "Model-based brightness constraints: On direct estimation of structure and motion," IEEE Trans. Pattern Anal. Machine Intell., 22(9):992-1015, 2000.
N. Dalal and B. Triggs, "Histograms of oriented gradients for human detection," Proc. CVPR, vol. 1, pp. 886-893, 2005.
E. Trucco and A. Verri, "Introductory Techniques for 3-D Computer Vision," Prentice-Hall, p. 147, 1998.
O. Faugeras, "Three-Dimensional Computer Vision: A Geometric Viewpoint," The MIT Press, pp. 271-274, 1996.

* cited by examiner

*Primary Examiner* — Zarni Maung
(74) *Attorney, Agent, or Firm* — Moser Taboada

(57) ABSTRACT

A method for estimating egomotion of a camera mounted on a vehicle that uses infra-red images is disclosed, comprising the steps of (a) receiving a pair of frames from a plurality of frames from the camera, the first frame being assigned to a previous frame and an anchor frame and the second frame being assigned to a current frame; (b) extracting features from the previous frame and the current frame; (c) finding correspondances between extracted features from the previous frame and the current frame; and (d) estimating the relative pose of the camera by minimizing reprojection errors from the correspondences to the anchor frame. The method can further comprise the steps of (e) assigning the current frame as the anchor frame when a predetermined amount of image motion between the current frame and the anchor frame is observed; (f) assigning the current frame to the previous frame and assigning a new frame from the plurality of frames to the current frame; and (g) repeating steps (b)-(f) until there are no more frames from the plurality of frames to process. Step (c) is based on an estimation of the focus of expansion between the previous frame and the current frame.

22 Claims, 4 Drawing Sheets

CAMERA EGOMOTION ESTIMATION FROM AN INFRA-RED IMAGE SEQUENCE FOR NIGHT VISION

CROSS-REFERENCE TO RELATED APPLICATIONS

This application claims the benefit of U.S. provisional patent application No. 61/028,861 filed Feb. 14, 2008, the disclosure of which is incorporated herein by reference in its entirety.

FIELD OF THE INVENTION

The present invention relates generally to vision systems, and more particularly, to an infrared (IR) vision system and method for estimating camera motion and hence vehicle motion from an infra-red image sequence.

BACKGROUND OF THE INVENTION

In recent years, there has been an increase in demand for using camera sensors in automotive applications. For example, cameras mounted in the rear view mirror of a vehicle are used to monitor a scene in the front of the vehicle to detect possible collisions with pedestrians or other vehicles. Night vision systems have also been introduced to enhance pedestrian safety in the presence of vehicluar traffic. One such system is a pedestrian detection system that uses a monocular infra-red camera.

In such applications, it is important to estimate the motions of the camera, which, since the camera is usually mounted rigidly to the vehicle, provides measurements of the motion of the vehicle itself. The types of vehicle motion, which can be expressed as rotation and translation, are related to the pose of the camera. Therefore, it is desirable to obtain the pose of a vehicle with respect to a ground plane, i.e., the road. The vehicle pose with respect to ground plane can be used to measure the distance to targets on the road when no alternative depth estimation method is available. For example, to identify threat situations in collision avoidance systems, it is desired to have an estimate of distance to targets in the path of a vehicle so that possible collisions can be identified and predicted. Secondly, egomotion of a vehicle can be used to directly estimate the ground plane from which a region of interest for further processing can be identified. In addition, vehicle motion information can be used to track targets (e.g., other vehicles and obstacles) robustly, especially at night.

One of the most commonly used approaches for camera pose estimation is to exploit correspondences between different views and compute a relative camera pose from matching features. The camera pose can be obtained by solving equations based on epipolar constraints. For example, in D. Nister, O. Naroditsky, and J. Bergen, "Visual Odometry," *Proc. IEEE Conf. on Comp. Vision and Patt. Recog.*, 01:652-659, 2004, Nister et. al. proposed a visual odometry that computes camera pose from Ransac based feature matching combined with a five-point algorithm for efficient pose computation. Optical-flow based methods have been proposed that computes pose by exploiting image flow on the ground or from image alignment. A direct method based approach has been adopted to avoid explicit calculation of optical-flow and feature matching. In J. G. Stein, O. Mano, and A. Shashua, "A robust method for computing vehicle ego-motion," 2000 and J. G. Stein and A. Shashua, "Model-based brightness constraints: On direct estimation of structure and motion," *IEEE Trans. Pattern Anal. Machine Intell.*, 22(9):992-1015, 2000, Stein et. al. presented a system that computes egomotion of vehicle based on points on ground plane under a constrained camera motion assumption. In this method, a set of uniformly tessellated image patches from the ground plane is selected to probabilistically integrate to solve a motion equation based on planar motion constraint and brightness constancy.

All of the above mentioned approaches are based on either strong feature matching or require sufficient texture for image flow computations. However, these conditions cannot be met easily in the infra-red domain. This is because in infra-red images taken of road scenes, the thermal response of the scenes vary smoothly in a relatively low dynamic range, which results in smoothed, low resolution images compared with visual range image data. Thus, conventional approaches cannot be directly applicable to robust pose estimation.

There are other diffulties that are encountered with the use of correspondence-based pose estimation. First, there are few good features to track in an IR images of the road scenes. In general, features of the road structure such as lane markers are not available. Secondly, good features are typically found at the periphery of image and cannot be tracked robustly due to large image motions. That is, features tracked from nearby road structures are more distinctive to match than ones farther away and provide better resolution for numerically stable solutions. However, nearby road structures move faster in the image and quickly disappear before matching can be attained.

Accordingly, what would be desirable, but has not yet been provided, are an accurate method and resulting system for estimating camera motion and hence vehicle pose and motion from a camera mounted on a vehicle that uses infra-red images for night time applications.

SUMMARY OF THE INVENTION

The above-described problems are addressed and a technical solution achieved in the art by providing a method and resulting system for estimating egomotion of a camera mounted on a vehicle, comprising the steps of (a) receiving a pair of frames from a plurality of frames from the camera, the first frame being assigned to a previous frame and an anchor frame and the second frame being assigned to a current frame; (b) extracting features from the previous frame and the current frame; (c) finding correspondances between extracted features from the previous frame and the current frame; and (d) estimating the relative pose of the camera by minimizing reprojection errors from the correspondences to the anchor frame. The method can further comprise the steps of (e) assigning the current frame as the anchor frame when a predetermined amount of image motion between the current frame and the anchor frame is observed; (f) assigning the current frame to the previous frame and assigning a new frame from the plurality of frames to the current frame; and (g) repeating steps (b)-(f) until there are no more frames from the plurality of frames to process.

Step (c) can be based on an estimation of the focus of expansion between the previous frame and the current frame. Step (c) can further comprise the step of rectifying the previous frame and the current frame to remove rotational components by aligning the projection of optical centers (epipoles) of each of the previous frame and the current frame; creating at least one triangular region in the current frame that is placed along a radial line formed by at least one extracted feature and the initial focus of expansion; for each point in the anchor frame, searching for a candidate set of features in the interior of the at least one triangular region; and matching features using histogram of oriented gradient (HOG) and sum of squared difference (SSD) measures.

Features can be extracted from edge points in the previous frame and the current frame using an edge extraction method. Reprojection error can be measured in pixel distance between the reprojected 3D estimate using the current relative pose estimate and the position of extracted feature points of the current frame. Step (d) can further further comprise the step of incrementaly updating the relative pose estimate in a gradient descent manner.

The estimated relative pose can be further processed for displaying an artificial ground plane or horizon in front of the vehicle.

BRIEF DESCRIPTION OF THE DRAWINGS

The present invention will be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

The present invention describes an egomotion estimation system and method that can work robustly with infra-red image sequences. The method is based on aggregate feature matching that exploits "focus of expansion" constraints from instantaneous vehicle motions. Pose and structure are simultaneously estimated and propagated to obtain camera pose in consecutive frames where features do not register sufficient image motions between frames. The proposed method is designed to specifically handle the difficulties that arise from (1) fragility of feature matching under low-resolution infrared imaging conditions, (2) noisy pose estimates due to small vehicle motion between image frames and (3) instability of pose estimation under dominant forward motions.

Figure 1:
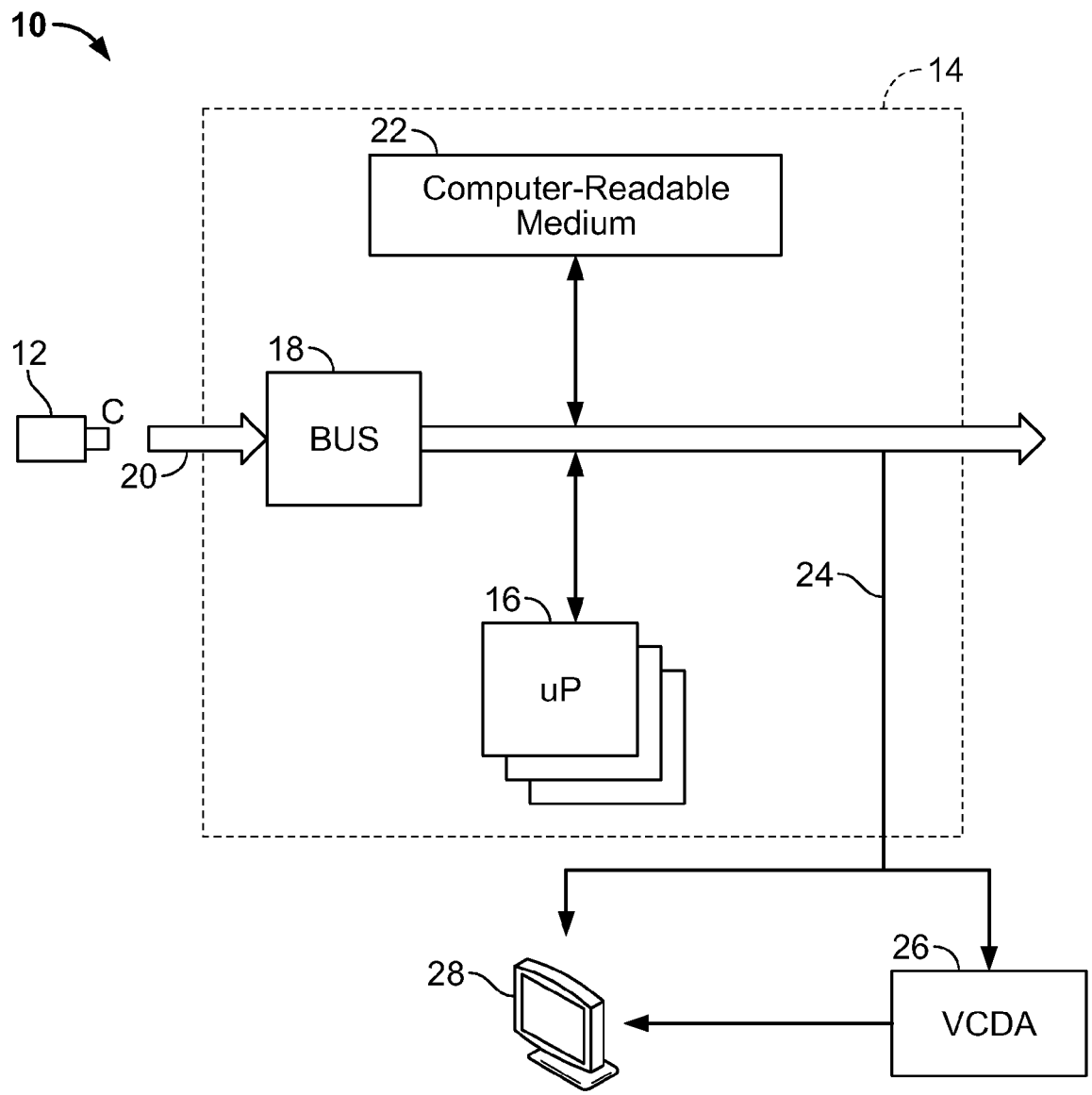
FIG. 1 is a block diagram of the hardware architecture of an egomotion estimation system, constructed according to an embodiment of the present invention.

Referring now to FIG. 1, there is shown an egomotion estimation system 10, constructed according to an embodiment of the present invention. By way of a non-limiting example, the system 10 receives a plurality of infra-red video frames from an infrared camera 12. The system 10 can also include a computing platform 14. The computing platform 14 may include an embedded system (e.g., an Intel platform with DUO (1.83 Ghz) processor) comprising one or more processors 16 which includes a bus system 18 (e.g., an on board CAN bus system) which is fed by a video data stream 20 via the one or more processors 16 or directly to a computer-readable medium 22. The computer readable medium 22 can also be used for storing the instructions of the system 10 to be executed by the one or more processors 16, including an operating system, such as the Windows or the Linux operating system. The computer readable medium 22 can include a combination of volatile memory, such as RAM memory, and non-volatile memory, such as flash memory, optical disk(s), and/or hard disk(s). In one embodiment, the non-volatile memory can include a RAID (redundant array of independent disks) system configured at level 0 (striped set) that allows continuous streaming of uncompressed data to disk without frame-drops. In such a system, the processed video/radar data stream can be stored temporarily in the computer readable medium 22 for later output. An output data stream 24 includes at least camera/vehicle pose data and optionally the input video data stream 20. The camera pose data can be fed to a vehicle control and driver awareness systems (VCDA) 26, such as Adaptive Cruise Control (ACC) and Forward Collision Warning (FCW) systems. Optionally, the camera pose data as well as the optional input video data stream 20 can be fed for display to the driver on an in-car monitor 28.

The vehicle pose with respect to ground plane can be used to measure and display the distance to targets on the ground when no alternative depth estimation method is available. For example, to identify threat situations in collision avoidance systems, it is desired to have an estimate of distance to targets in the path of vehicle so that possible collisions can be identified and predicted. The numerical pose data can be directly displayed or be further processed to display an artificial ground plane or horizon in front of the vehicle that changes in response to changes in camera pose data. In addition, vehicle motion information can be used in tracking targets robustly.

Figure 2:
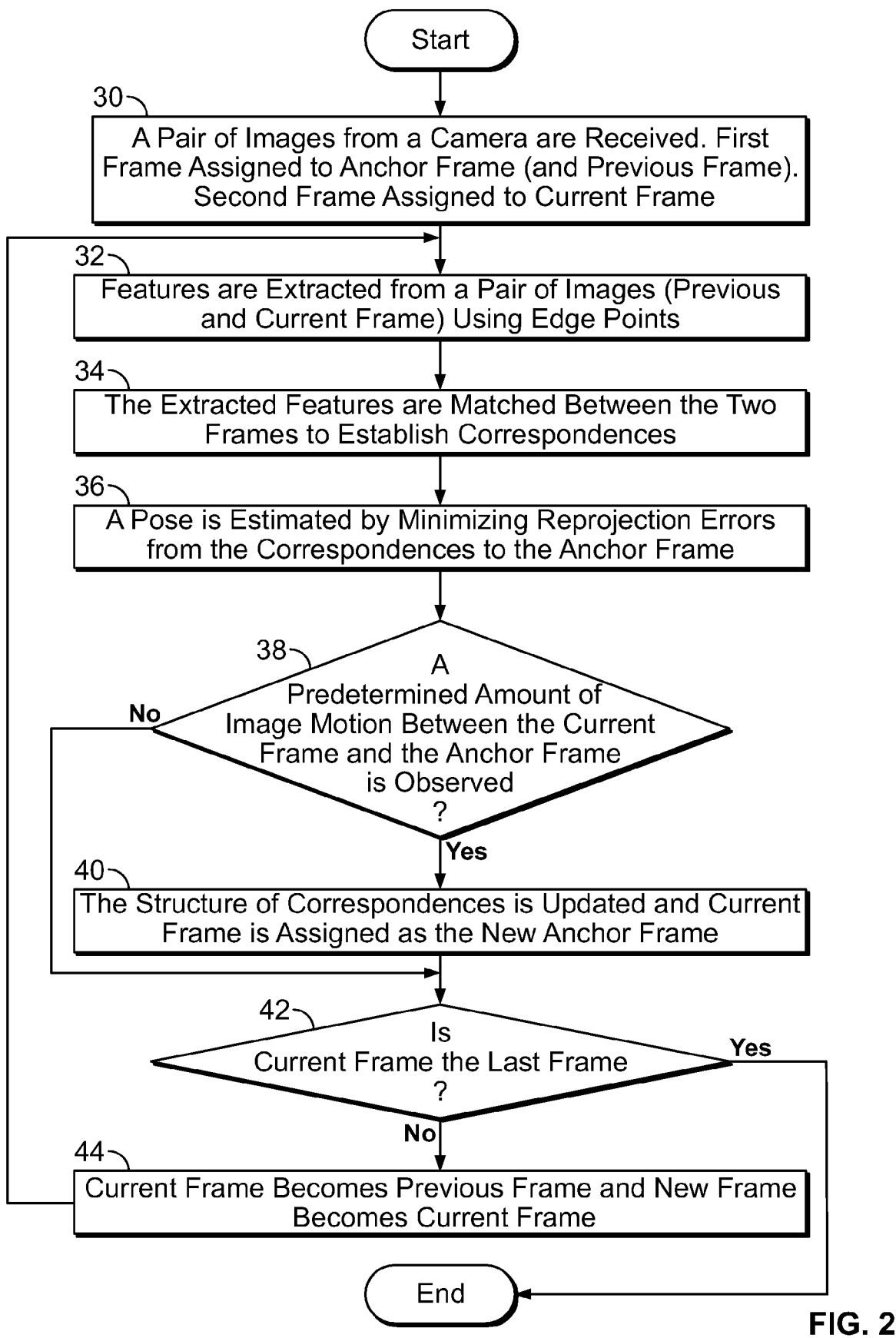
FIG. 2 is a block diagram of software architecture for implementing a method for estimating egomotion associated with the system of FIG. 1.

Referring now to FIG. 2, a block diagram illustrating the software architecture of the present invention is depicted. At step 30, a pair of frames from a plurality of frames from the camera 12 is received. The first frame is assigned to a previous frame and an anchor (reference) frame and the second frame is assigned to a current frame. At step 32, given the two frames, features are extracted. Edge points are used as features for matching and they are obtained by applying a typical edge extraction method. The edge points are formed at intensity discontinuities. At step 34, the extracted features are matched between the two frames to establish correspondences, i.e., the same edge points which are a projection of the same scene part, are sought and matched in both the previous frame and the current frame. At step 36, the relative pose for the current frame is estimated by minimizing reprojection errors from the correspondences to the anchor frame. At step 38, if a predetermined amount of image motion between the current frame and an anchor frame is observed, the at step 40, a structure of correspondences, i.e., 3D information of the matching image points, is updated and current frame is assigned as the new anchor frame. At step 42, if the current frame is not the last frame, then at step 44, the current frame is assigned as the previous frame and a new frame is assigned as the current frame. Then, steps 32-44 are repeated until there are no more frames to be processed.

The present invention exploits the observation that under translational motion, matching points between two frames move in a radial pattern that centers on a point, i.e., the focus of expansion (FOE). To utilize the FOE, frames are first rectified to remove rotational components by aligning the projection of optical centers of each view (i.e., epipoles). Then, the search for correspondence is made along a radially expanding direction from an estimated FOE that is obtained during the rectification process.

Images can be rectified to obtain an FOE estimate without explicitly computing full rotational motion. Motion is typically dominated by either forward motions $T(T_z, T_x, T_y)$ or combination of both rotation and translation. The instantaneous rotational motion in this case is usually indistinguishable from translational motion and thus can be reasonably approximated by it. The present invention assumes that under instantaneous vehicle motion, the roll component of the vehicle's rotational motion is typically bounded by a small $\delta_\theta$, so that images can be rectified by aligning images in x and y directions. Once rotational motion is removed, any remaining motion between images can be attributed to translational motion.

Under pure translational motion, correspondences between two frames form a radial pattern centering on a point, i.e., the FOE. In such circumstances, the FOE is a projection of translational direction on the current frame relative to the previous frame $$\left(f_x \frac{\Delta X}{\Delta Z} + c_x, f_y \frac{\Delta Y}{\Delta Z} + c_y\right),$$

where $(\Delta X; \Delta Y; \Delta Z)$ is a translational motion and $(f_x, f_y; c_x, c_y)$ are the focal length and the current frame center, which is is also coincident with the epipole of the current image.

More specifically, the translation between two frames is computed by aligning the epipoles of each image (frame). This is equivalent to correcting pitch and yaw components of rotation, and the remaining one degree of freedom from roll is taken into consideration later at the feature matching stage.

image displacement→epipole
alignment→rectification

Accordingly, rectification can be approximated by aligning the epipoles of two input images, which in turn can be approximated by computing the image displacement between the two frames. The image offset (displacement) $(\delta_x, \delta_y)$ between the two frames can be computed from overall motion in x and y directions independently. Specifically, motion in each direction is estimated by comparing cumulative pixel values from row and column histograms. For example, image offset in x direction can be computed by first summing gray values at feature points along a column and offset is measured from maximum correlation of the row and column histograms as follows:

$$\begin{cases} I_{hist\_row}(x_i) = \sum_{y_p} I(x_p, y_p), \text{ where } x_p = x_i \\ I_{hist\_col}(y_i) = \sum_{x_p} I(x_p, y_p), \text{ where } y_p = y_i \end{cases}$$

$$\delta_x = \underset{\alpha}{\text{minarg}}(|I_{hist\_row}^c(x+\alpha) - I_{hist\_row}^n(x)|)$$

The offset $(\delta_x, \delta_y)$ is obtained from the maximum correlation between two histograms from each image along the x and y directions, respectively.

Then the initial FOE can then be expressed as $x_{foe}^\circ = (c_x + \delta_x, c_y + \delta_y)$. Note that the displacement vector $(\delta_x, \delta_y)$ is essentially the motion of the epipole, i.e., the projection of optical centers of the two images.

Figure 3:
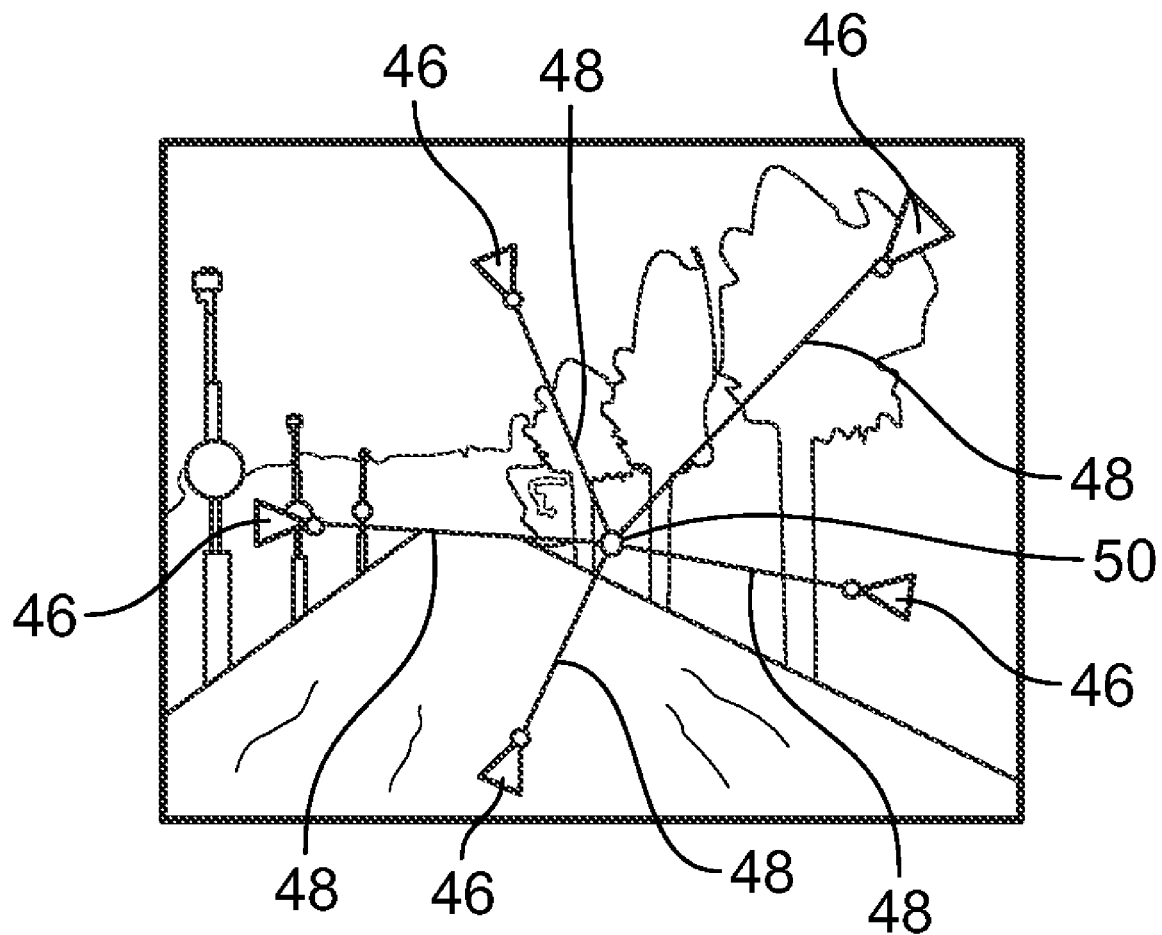
FIG. 3 is a diagram illustrating visually how searches for matching points is made in a triangular region that is placed along a radial line formed by extracted feature points and an initial focus of expansion.

Given two sets of features $\{xtt_c\}$ and $\{xtt_n\}$, correspondences are found by utilizing the estimated initial FOE. Referring now to FIG. 3, the search for matching points is made in a triangular region 46 that is placed along a radial line 48 formed by $xtt_c(i)$ 48 and initial focus of expansion, $x_{foe}^\circ$ 50. For each point in the anchor frame, a candidate set of features is searched in the interior of the triangular region 46 and matched by a histogram of oriented gradient (HOG) and sum of squared difference (SSD) measures. HOG is used to reduce the number of candidate features before applying SSD and a match is found at the minimum of SSD error. HOG is described in N. Dalal and B. Triggs, "Histograms of oriented gradients for human detection," *Proc. CVPR*, volume 1, pages 886-893, 2005. SSD is described in E. Trucco and A. Verri, "Introductory Techniques for 3-D Computer Vision," Prentice-Hall, page 147, 1998.

The next step is to estimate the pose for the current frame. The pose of the current frame is computed with respect to the anchor frame where correspondences between two frames and 3D estimate of those points are available. In many circumstances, sufficient image motions are not available for resolving pose from correspondences in neighboring frames. For example, points around the center of an image register very small image motions while points at the periphery quickly disappear before matching. Instead of computing pose directly from correspondences, the present invention estimates pose from an updated structure of correspondences. The pose is estimated by minimizing reprojection error of 3D estimates of the correspondences onto the current frame where pose $\{R_{est}, T_{est}\}$ is updated incrementally in a gradient descent manner.

First, an initial estimate of pose between two frames is obtained by solving the 8-point algorithm as described in O. Faugeras, "Three-Dimensional Computer Vision: A Geometric Viewpoint," THE MIT PRESS, pages 271-274, 1996. Because of noise in the matching process, such as from outliers and limited resolution from insufficient image motions, the initial estimate is expected to be noise. Given initial estimates of $\{R_0, T_0\}$ the pose is updated iteratively by computing $\delta R$ and $\delta T$ as follows.

From $\alpha_i K^{-1} x_i^n = R_{est} X_i^c + T_{est}$, direction and scale of $\delta T$ can be computed by $$\delta T_{est}(j) = \text{mineig}(K^{-1} x_i^n \times R_{est} X_i^c)$$

$$T_{est} = T_{est} + \alpha(j) * \delta T_{est}(j)$$

where $\alpha(j) = S_{rate} S_{scale} S_{dir\_conv}$ and mineig( ) denotes minimum eigenvector of a 3×3 matrix, $K^{-1}, x_i^n X_i^c$ denotes the intrinsic camera matrix, 2d image point on the current frame, and a 3D estimate of the 2d image point in anchor frame, respectively.

The scalar variables $S_{rate}, S_{scalor}$ and $S_{dir\_conv}$ denote convergence speed, scale of $\delta T$ and sign of $\delta T$, respectively.

$$\delta R_{est}(j) = \underset{SR}{\text{minarg}}(|\delta R * N[K^{-1} x_i^n] - N[R_{est} X_1^c + T_{est}]|)$$

$$R_{est} = \text{rodrigues}(\delta R_{est}(j)) R_{est}$$

where, $N[u] = \dfrac{u}{|u|}$

At each iteration, reprojection error is measured in pixel distance between the reprojected 3D estimate using the current pose estimate and the position of extracted feature points of the current frame. The estimated error is then used to control convergence speed and direction of $\delta T$ in a gradient-descent manner. Typically, a maximum 10 of iterations are needed for convergence in computing pose between two frames.

When image motion (change in pose) between current frame and anchor frame exceeds a predetermined threshold, a 3D structure of correspondences (points), i.e., a 3D estimate of the matching points, is updated and the current frame is assigned as the anchor frame. The updated structure of correspondences can be used for minimizing reprojection errors in the motion estimation as shown in steps 32 and 34 of FIG.

2. Given the set of correspondences between anchor frame and current frame, $\{x_c\}, \{x_n\}$ and relative pose $\{R_c{}^n T_c{}^n\}$ the structure of correspondences is computed by estimating a scale of points, $\alpha_i, \beta_i$ in normalized coordinates that satisfy $$|\alpha_i R_c{}^n K^{-1} x_c(i) + T_c{}^n - \beta_i K^{-1} x_n(i)| \to \min$$

where $X^c(i) = \alpha_i K^{-1} x_c(i)$

Figure 4A:
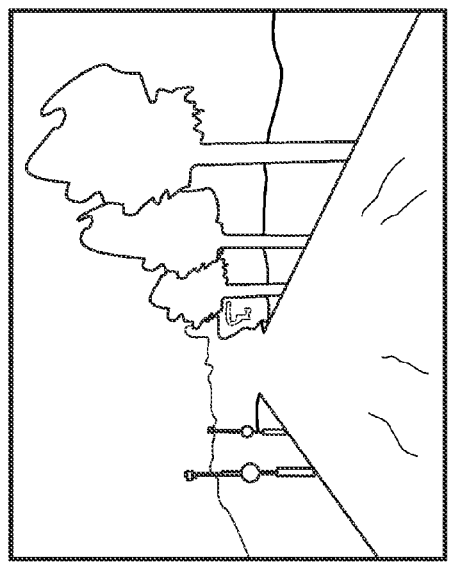
FIGS. 4A-4C show an example of a biased pattern of iso-disparity surface in the situation of forward camera motion and reconstruction of features.
Figure 4C:
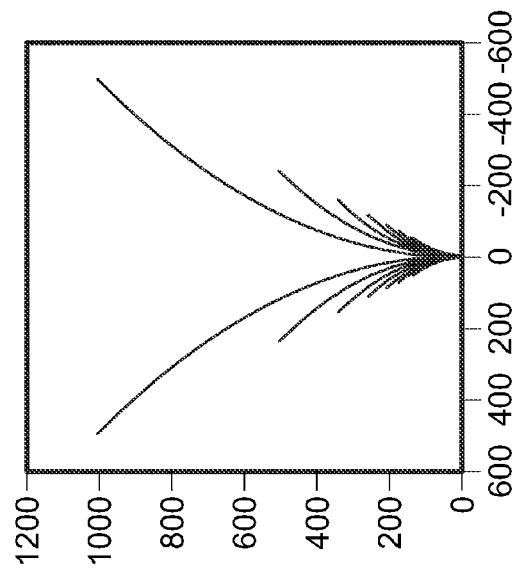
Figure 4B:
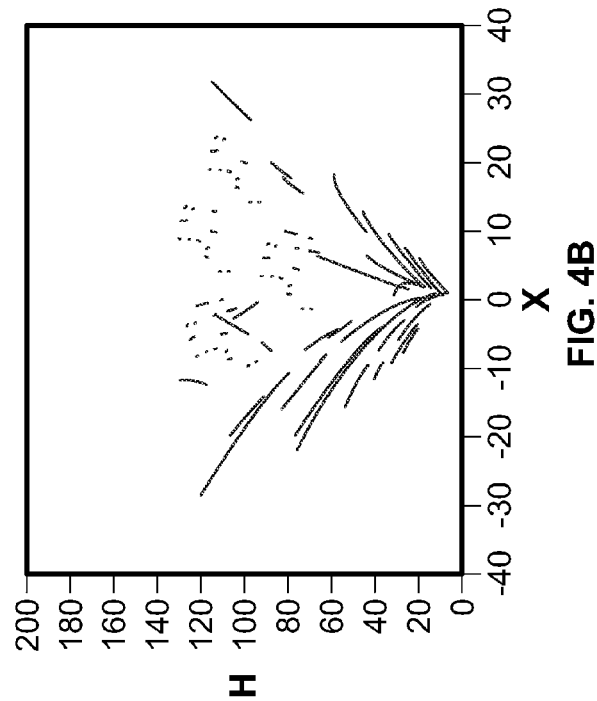

FIGS. 4A-4C show an example of a biased pattern of iso-disparity surface in the situation of forward camera motion and reconstruction of features. FIG. 4A is a snap shot of scene from a forward moving camera. FIG. 4B is a plot of a top-down view of reconstruction. FIG. 4C is a plot of an analytical iso-disparity curve from forward camera motion. Reconstruction in FIG. 4C shows biased pattern as shown in FIG. 4C. Thus, the 3D structure of correspondences that is obtained under forward camera motion shows biased pattern toward direction of motion. This can be explained by iso-disparity surface formation. An iso-disparity surface is a surface that is observed at unit disparity along an epipolar line. As shown in FIG. 4C, the iso-disparity plot shows larger ambiguity towards center (direction of motion, FOE), which incurs larger $$\frac{\delta Z}{\delta d}.$$

That is, the ambiguity of 3D estimates increases proportionally to the displacement from the FOE and inversely proportionally to depth. For example, it is assumed that the camera undergoes pure translation of $(\Delta X, \Delta Y, \Delta Z)^T$. Note that general motion can be transformed to this case after rectification. Then displacement of correspondences in each axis can be expressed as $$\delta x_i = f_x \frac{X_i}{Z} + c_x - \left( f_x \frac{X_i + \Delta X}{Z + \Delta Z} + c_x \right),$$

which is equivalent to $$\delta x_i = \frac{\Delta Z}{Z + \Delta Z}(x_i - FOE_x),$$

where $$FOE_x = f_x \frac{\Delta X}{\Delta Z} + c_x.$$

Note that in the lateral camera placement where $\Delta Z = 0$, the displacement $\delta_x$ in the above equation becomes $$f_x \frac{\Delta X}{Z},$$

which corresponds to disparity and the amount of displacement is inversely proportional to depth only.

Absolute camera pose with respect to ground plane can also be estimated by combining egomotion and vanishing point (VP) estimates that is obtained from structures on the ground plane such as line markers. In this scheme, the goal is to compute vehicle (camera) pitch with respect to the ground plane for the purpose of estimating the distance to a target from image to ground mapping. A simple integration scheme is proposed that is based on a confidence measure of each estimate which reflects estimate error and ambiguity. Basically, two estimates of vanishing line (VL) are produced from each module that are combined with the confidence measure.

First, egomotion module produces an estimate of $VL_{ego}$ VL by integrating instantaneous motions, which is then subtracted by camera offset $\theta_{offset}(t)$. The VP estimation routine separately computes an estimate of $VL_{vp}(\theta_{vp})$. Both estimates are combined as follows.

$$VL_{vpopt} = f(vp_{conf}) VL_{vp} + f(ego_{conf}) VL_{ego}$$

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for estimating egomotion of a camera mounted on a vehicle, comprising the steps of:
    (a) receiving a pair of frames from a plurality of frames from the camera, the first frame being assigned to a previous frame and an anchor frame and the second frame being assigned to a current frame;
    (b) extracting features from the previous frame and the current frame;
    (c) finding correspondences between extracted features from the previous frame and the current frame; and
    (d) estimating the relative pose of the camera by minimizing reprojection errors from the correspondences to the anchor frame.

2. The method of claim 1, further comprising the steps of:
    (e) assigning the current frame as the anchor frame when a predetermined amount of image motion between the current frame and the anchor frame is observed;
    (f) assigning the current frame to the previous frame and assigning a new frame from the plurality of frames to the current frame; and
    (g) repeating steps (b)-(f) until there are no more frames from the plurality of frames to process.

3. The method of claim 1, wherein step (c) is based on an estimation of the focus of expansion between the previous frame and the current frame.

4. The method of claim 3, wherein step (c) further comprises the step of:
    rectifying the previous frame and the current frame to remove rotational components by aligning the projection of optical centers (epipoles) of each of the previous frame and the current frame.

5. The method of claim 4, further comprising the steps of computing the image displacement between the previous frame and the current frame by comparing cumulative pixel values from row and column histograms.

6. The method of claim 5, further comprising the steps of:
    summing gray values at feature points along columns and rows of displacement; and
    measuring offsets from the maximum correlation of the column and row histograms.

7. The method of claim 4, further comprising the steps of:
    creating at least one triangular region in the current frame that is placed along a radial line formed by at least one extracted feature and the initial focus of expansion;

for each point in the anchor frame, searching for a candidate set of features in the interior of the at least one triangular region; and matching features using histogram of oriented gradient (HOG) and sum of squared difference (SSD) measures.

8. The method of claim 1, wherein features are extracted from edge points in the previous frame and the current frame using an edge extraction method.

9. The method of claim 1, wherein reprojection error is measured in pixel distance between the reprojected 3D estimate using the estimated relative pose and the position of extracted feature points of the current frame.

10. The method of claim 9, wherein step (d) further comprises the step of incrementaly updating the estimated relative pose in a gradient descent manner.

11. The method of claim 1, wherein the estimated relative pose is further processed for displaying an artificial ground plane or horizon in front of the vehicle.

12. A system for estimating egomotion of a camera mounted on a vehicle, comprising:
   a camera for receiving a pair of frames from a plurality of frames, the first frame being assigned to a previous frame and an anchor frame and the second frame being assigned to a current frame; and
   a processor communicatively connected to said camera, said processor being configured for:
   (a) extracting features from the previous frame and the current frame;
   (b) finding correspondences between extracted features from the previous frame and the current frame; and
   (c) estimating the relative pose of the camera by minimizing reprojection errors from the correspondences to the anchor frame.

13. The system of claim 2, wherein the processor is further configured for:
   (d) assigning the current frame as the anchor frame when a predetermined amount of image motion between the current frame and the anchor frame is observed;
   (e) assigning the current frame to the previous frame and assigning a new frame from the plurality of frames to the current frame; and
   (f) repeating steps (a)-(e) until there are no more frames from the plurality of frames to process.

14. The system of claim 12, wherein step (b) is based on an estimation of the focus of expansion between the previous frame and the current frame.

15. The system of claim 14, wherein step (b) further comprises the step of:
   rectifying the previous frame and the current frame to remove rotational components by aligning the projection of optical centers (epipoles) of each of the previous frame and the current frame.

16. The system of claim 15, wherein the processor is further configured for:
   creating at least one triangular region in the current frame that is placed along a radial line formed by at least one extracted feature and the initial focus of expansion;

for each point in the anchor frame, searching for a candidate set of features in the interior of the at least one triangular region; and matching features using histogram of oriented gradient (HOG) and sum of squared difference (SSD) measures.

17. The system of claim 12, further comprising a display, wherein the estimated relative pose is further processed for displaying an artificial ground plane or horizon on said display.

18. A non-transitory computer-readable medium carrying one or more sequences for estimating egomotion of a camera mounted on a vehicle, wherein execution of the one of more sequences of instructions by one or more processors causes the one or more processors to perform the steps of:
   (a) receiving a pair of frames from a plurality of frames from the camera, the first frame being assigned to a previous frame and an anchor frame and the second frame being assigned to a current frame;
   (b) extracting features from the previous frame and the current frame;
   (c) finding correspondences between extracted features from the previous frame and the current frame; and
   (d) estimating the relative pose of the camera by minimizing reprojection errors from the correspondences to the anchor frame.

19. The computer-readable medium of claim 18, further comprising the steps of:
   (e) assigning the current frame to the anchor frame when a predetermined amount of image motion between the current frame and the anchor frame is observed;
   (f) assigning the current frame to the previous frame and assigning a new frame from the plurality of frames to the current frame; and
   (g) repeating steps (b)-(f) until there are no more frames from the plurality of frames to process.

20. The computer-readable medium of claim 18, wherein step (c) is based on an estimation of the focus of expansion between the previous frame and the current frame.

21. The computer-readable medium of claim 20, wherein step (c) further comprises the step of:
   rectifying the previous frame and the current frame to remove rotational components by aligning the projection of optical centers (epipoles) of each of the previous frame and the current frame.

22. The computer-readable medium of claim 21, further comprising the steps of:
   creating at least one triangular region in the current frame that is placed along a radial line formed by at least one extracted feature and the initial focus of expansion;
   for each point in the anchor frame, searching for a candidate set of features in the interior of the at least one triangular region; and
   matching features using histogram of oriented gradient (HOG) and sum of squared difference (SSD) measures.

* * * * *